(12) United States Patent
Nakamura (10) Patent No.: US 11,972,643 B2
(45) Date of Patent: Apr. 30, 2024

(54) MANAGEMENT SERVER AND MANAGEMENT SYSTEM

(71) Applicant: TOYOTA JIDOSHA KABUSHIKI KAISHA, Toyota (JP)

(72) Inventor: Tohru Nakamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 99 days.

(21) Appl. No.: 17/822,947

(22) Filed: Aug. 29, 2022

(65) Prior Publication Data

US 2023/0128961 A1 Apr. 27, 2023

(30) Foreign Application Priority Data

Oct. 26, 2021 (JP) ................................. 2021-174478

(51) Int. Cl.
*G07C 5/08* (2006.01)
*B60L 53/66* (2019.01)
*B60L 58/16* (2019.01)

(52) U.S. Cl.
CPC .............. *G07C 5/08* (2013.01); *B60L 53/665* (2019.02); *B60L 58/16* (2019.02)

(58) Field of Classification Search
CPC .......... G07C 5/08; B60L 58/16; B60L 53/665
USPC ....................................................... 340/455
See application file for complete search history.

(56) References Cited

U.S. PATENT DOCUMENTS

| 2009/0252113 | A1* | 10/2009 | Take | H04W 36/30 370/331 |
| 2011/0213520 | A1* | 9/2011 | Yaguchi | B60L 58/12 701/22 |
| 2013/0063283 | A1* | 3/2013 | Kashima | G01C 21/3679 340/988 |
| 2013/0226441 | A1* | 8/2013 | Horita | G01C 21/3469 701/117 |
| 2014/0257884 | A1* | 9/2014 | Kyoung | G06Q 10/02 705/5 |
| 2015/0198459 | A1* | 7/2015 | MacNeille | G01C 21/3697 701/22 |
| 2015/0294329 | A1* | 10/2015 | Saito | B60L 3/0046 705/7.31 |
| 2018/0045533 | A1* | 2/2018 | Jackson | G01C 21/3682 |

FOREIGN PATENT DOCUMENTS

JP 2013-055806 A 3/2013

* cited by examiner

*Primary Examiner* — Kerri L McNally
(74) *Attorney, Agent, or Firm* — Finnegan, Henderson, Farabow, Garrett & Dunner, LLP (57) ABSTRACT

A CEMS server includes a control device that executes a notification process of notifying a user of an electrified vehicle of promotion information for promoting charge or discharge, and a storage device that stores a program executable by the control device. The control device executes the notification process in a case where a first condition and a second condition are satisfied. The control device does not execute the notification process in a case where the first condition or the second condition is not satisfied. The first condition is a condition that a destination of the electrified vehicle is a predetermined place at which the charge or discharge of the electrified vehicle is possible. The second condition is a condition that a request for the charge or discharge is estimated in a period in which the electrified vehicle is present at the predetermined place.

8 Claims, 8 Drawing Sheets

PARKING LOT TABLE

| PARKING LOT ID | PLACE INFORMATION |
|---|---|
| X1 | Y1 |
| X2 | Y2 |
| ... | ... |
| ... | ... |

FIG. 4

VEHICLE TABLE

| VEHICLE ID | CURRENT PLACE | SOC OF BATTERY | SOH OF BATTERY | HISTORY DATA ||| USER TERMINAL ID |
| | | | | HOME PARKING TIME ZONE | COMPANY PARKING TIME ZONE | CONNECTOR CONNECTION TIME ZONE | |
| A1 | B1 | C1 | D1 | E1 TO F1 | G1 TO H1 | J1 TO K1 | L1 |
| | | | | | | M1 TO N1 | |
| A2 | B2 | C2 | D2 | E2 TO F2 | G2 TO H2 | J2 TO K2 | L2 |
| ... | ... | ... | ... | ... | ... | ... | ... |

MANAGEMENT SERVER AND MANAGEMENT SYSTEM

CROSS-REFERENCE TO RELATED APPLICATION

This application claims priority to Japanese Patent Application No. 2021-174478 filed on Oct. 26, 2021, incorporated herein by reference in its entirety.

BACKGROUND

1. Technical Field

The present disclosure relates to a management server and a management system.

2. Description of Related Art

Japanese Unexamined Patent Application Publication No. 2013-55806 (JP 2013-55806 A) discloses an in-vehicle device mounted on an electrified vehicle. The electrified vehicle includes a door and a door lock detection unit that detects a lock of the door. In addition, the electrified vehicle is charged by being connected to electric vehicle supply equipment outside the electrified vehicle. The in-vehicle device detects the lock of the door of the electrified vehicle and executes a user notification in a case where the electrified vehicle is not connected to the electric vehicle supply equipment. The user notification is a notification to charge the electrified vehicle.

SUMMARY

In the in-vehicle device disclosed in JP 2013-55806 A, in some cases, the user notification is executed even in a case where the electrified vehicle does not need to be charged. Therefore, a problem that a user is caused to feel annoyed about charge or discharge of the electrified vehicle can occur.

The present disclosure is to provide a technology for appropriately giving a notification of promotion information about charge or discharge of the electrified vehicle while reducing annoyance of the user.

A first aspect of the present disclosure relates to a management server that manages an electrified vehicle. The electrified vehicle is configured to execute charge or discharge that is charge from an outside of the electrified vehicle or discharge from the outside of the electrified vehicle. The management server includes a processor configured to execute a notification process of notifying a user of the electrified vehicle of promotion information for promoting the charge or discharge, and a memory configured to store a program executable by the processor. The processor is configured to execute the notification process in a case where a first condition and a second condition are satisfied. The processor is configured not to execute the notification process in a case where the first condition or the second condition is not satisfied. The first condition is a condition that a destination of the electrified vehicle is a predetermined place at which the charge or discharge of the electrified vehicle is possible. The second condition is a condition that a request for the charge or discharge is estimated in a period in which the electrified vehicle is present at the predetermined place.

With such a configuration, the management server executes the notification process of notifying the user of the promotion information for promoting the charge or discharge in a case where the first condition that the destination of the electrified vehicle is the predetermined place at which the charge or discharge of the electrified vehicle is possible, and the second condition that the request for the charge or discharge is estimated in the period in which the electrified vehicle is present at the predetermined place are satisfied. On the other hand, the management server does not execute the notification process in a case where the first condition or the second condition is not satisfied. Accordingly, the management server can execute the notification process at an appropriate timing while reducing the annoyance of the user.

In addition, the processor may be configured to execute the notification process in a case where a third condition that a charge or discharge amount adjustable by the charge or discharge is equal to or larger than a first threshold value, the first condition, and the second condition are satisfied, and not to execute the notification process in a case where the third condition is not satisfied.

With such a configuration, the management server can execute the notification process at an appropriate timing while reducing the annoyance of the user.

The processor may be configured to execute the notification process in a case where a fourth condition that a deterioration degree of a battery that is a target of the charge or discharge is equal to or smaller than a second threshold value, the first condition, and the second condition are satisfied, and not to execute the notification process in a case where the fourth condition is not satisfied.

With such a configuration, the management server can execute the notification process at an appropriate timing while reducing the annoyance of the user.

In addition, the processor may be configured to change a notification degree of the notification process based on an estimation result of whether or not the charge or discharge of the electrified vehicle is executed at the predetermined place.

With such a configuration, the management server can execute the notification process with the notification degree reflecting the estimation result of whether or not the charge or discharge of the electrified vehicle is executed.

The processor may be configured to execute the notification process of notifying a first number of notification devices of the promotion information in a case where the estimation result is a result that the charge or discharge of the electrified vehicle is not executed at the predetermined place, and to execute the notification process of notifying a second number of notification devices smaller than the first number of the promotion information in a case where the estimation result is a result that the charge or discharge of the electrified vehicle is executed at the predetermined place.

With such a configuration, since the notification process is executed with respect to the first number of notification devices larger than the second number in a case where the estimation is made that the charge or discharge of the electrified vehicle is not executed, the charge or discharge can be strongly promoted for the user. In addition, since the notification process is executed with respect to the second number of notification devices smaller than the first number in a case in which the estimation is made that the charge or discharge of the electrified vehicle is executed, the management server can promote the charge or discharge while reducing the annoyance of the user.

The electrified vehicle may be configured to execute the charge or discharge in accordance with a demand response, and the request may be an increase demand response or a decrease demand response.

With such a configuration, even in a case where the request for the charge or discharge is executed in accordance with the increase demand response or the decrease demand response, the management server can execute the notification process at an appropriate timing while reducing the annoyance of the user.

The electrified vehicle may be configured to execute the charge or discharge by insertion of a charge or discharge connector, and the notification process may be a process of promoting insertion of the charge or discharge connector into the electrified vehicle.

With such a configuration, the management server can execute the notification process regarding the charge or discharge of the charge or discharge connector while reducing the annoyance of the user.

A second aspect of the present disclosure relates to a management system including an electrified vehicle, and a management server configured to manage the electrified vehicle. The electrified vehicle is configured to execute charge or discharge that is charge from an outside of the electrified vehicle or discharge from the outside of the electrified vehicle. The management server is configured to execute a notification process of notifying a user of the electrified vehicle to promote the charge or discharge in a case where a first condition and a second condition are satisfied. The management server is configured not to execute the notification process in a case where the first condition or the second condition is not satisfied. The first condition is a condition that a destination of the electrified vehicle is a predetermined place at which the charge or discharge of the electrified vehicle is possible. The second condition is a condition that a request for the charge or discharge is estimated in a period in which the electrified vehicle is present at the predetermined place.

With such a configuration, the management server can execute the notification process at an appropriate timing while reducing the annoyance of the user.

According to the present disclosure, the management server can appropriately give a notification of the promotion information of the charge or discharge of the electrified vehicle while reducing the annoyance of the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a diagram showing a functional block diagram of a CEMS server and the like;

DETAILED DESCRIPTION OF EMBODIMENTS

In the following, an embodiment of the present disclosure will be described in detail with reference to the drawings. It should be noted that, in the figures, the same or corresponding parts are designated by the same reference signs and the description thereof will not be repeated.

Overall Configuration of Power Management System

Figure 1:
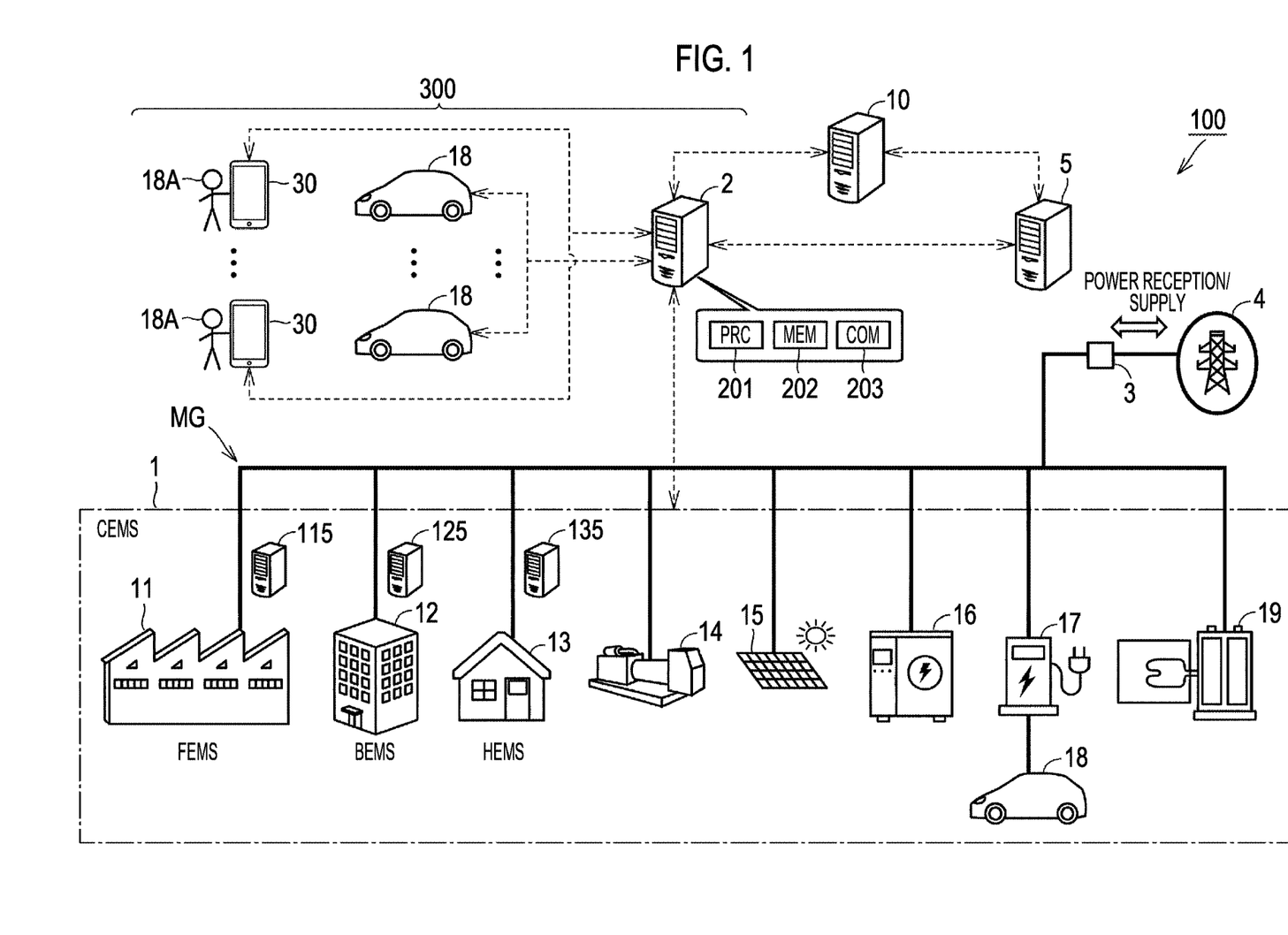
FIG. 1 is a diagram showing a schematic configuration of a power management system according to the present embodiment.

FIG. 1 is a diagram showing a schematic configuration of a power management system 100 according to the present embodiment. The power management system 100 typically corresponds to a virtual power plant (VPP).

The power management system 100 includes a CEMS 1, a CEMS server 2, power receiving and transforming equipment 3, a power system 4, a power transmission and distribution company server 5, and a market server 10. The CEMS means a community energy management system or a city energy management system.

The CEMS 1 includes a factory energy management system (FEMS) 11, a building energy management system (BEMS) 12, a home energy management system (HEMS) 13, a generator 14, a natural fluctuation power supply 15, an energy storage system (ESS) 16, an electric vehicle supply equipment (EVSE) 17, an electrified vehicle 18, and a heat storage system 19. In the CEMS 1, a microgrid MG is constructed by these components.

The FEMS 11 is a system that manages the supply and demand of the power used in a factory. The FEMS 11 includes a factory building (including air conditioning equipment and lighting equipment), industrial equipment (production line and the like), and the like operated by the power supplied from the microgrid MG. Although not shown, the FEMS 11 can include power generation equipment (generator, solar panel, and the like) installed in the factory. In some cases, the power generated by these pieces of power generation equipment is supplied to the microgrid MG. In addition, the FEMS 11 may include power generation equipment (solar panel and the like) or may include a cold heat source system (waste heat recovery system, heat storage system, and the like). The FEMS 11 further includes an FEMS server 115 that can execute bidirectional communication with the CEMS server 2.

The BEMS 12 is a system that manages the supply and demand of the power used in a building, such as an office or a commercial facility. The BEMS 12 includes air conditioning equipment and lighting equipment installed in the building. The BEMS 12 may include power generation equipment and/or a cold heat source system. The BEMS 12 further includes a BEMS server 125 that can execute bidirectional communication with the CEMS server 2.

The HEMS 13 is a system that manages the supply and demand of the power used at home. The HEMS 13 includes a household appliance (air conditioning equipment, lighting equipment, other electric appliances, and the like) operated by the power supplied from the microgrid MG. In addition, the HEMS 13 may include a solar panel, a household heat pump system, a household cogeneration system, a household storage battery, and the like. The HEMS 13 further includes an HEMS server 135 that can execute bidirectional communication with the CEMS server 2.

The generator 14 is power generation equipment that does not depend on a weather condition, and outputs the generated power to the microgrid MG. The generator 14 can include a steam turbine generator, a gas turbine generator, a diesel engine generator, a gas engine generator, a biomass generator, a stationary fuel cell, and the like. The generator 14 may include a cogeneration system that utilizes heat generated during the power generation.

The natural fluctuation power supply 15 is power generation equipment of which power generation output fluctuates depending on a weather condition, and outputs the generated power to the microgrid MG. Although solar power generation equipment (solar panel) is shown in FIG. 1, the natural fluctuation power supply 15 may include wind power generation equipment instead of or in addition to the solar power generation equipment.

The energy storage system 16 is a stationary power storage device that stores the power generated by the natural fluctuation power supply 15 and the like. The power storage device is a secondary battery, such as a lithium ion battery or a nickel hydrogen battery, and for example, a traveling battery (recycled product) that has been mounted on a vehicle in the past can be used. It should be noted that the energy storage system 16 is not limited to the secondary battery, and may be a power-to-gas device that produces gaseous fuel (hydrogen, methane, and the like) using surplus power.

The electric vehicle supply equipment 17 is a charge stand configured to charge the electrified vehicle 18. The electric vehicle supply equipment 17 may be a household charger. The electric vehicle supply equipment 17 may be electrically connected to the microgrid MG and configured to discharge (feed) the microgrid MG. That is, the electric vehicle supply equipment 17 is equipment that can execute charge of the electrified vehicle 18 and discharge of the electrified vehicle. In the following, in some cases, the charge or discharge is also be collectively referred to as "charge or discharge".

The electrified vehicle 18 is a vehicle that can travel by consuming the power. Specifically, the electrified vehicle 18 is a plug-in hybrid vehicle (PHV), an electric vehicle (EV), or the like.

The heat storage system 19 includes a heat storage tank provided between a heat source machine and a load (air conditioning equipment and the like), and is configured to temporarily store a liquid medium in the heat storage tank in a heat-retaining state. By using the heat storage system 19, the generation and consumption of the heat can be deviated based on time. For example, it is possible to store the heat generated by consuming the power at night and operating the heat source machine in the heat storage tank, and to consume the heat in the daytime for air conditioning.

It should be noted that, in the example shown in FIG. 1, the FEMS 11, the BEMS 12, the HEMS 13, the generator 14, the natural fluctuation power supply 15, the energy storage system 16, the electric vehicle supply equipment 17, the electrified vehicle 18, and the heat storage system 19 provided in the CEMS 1 are provided one by one, but the number of these systems or pieces of equipment is optional. The CEMS 1 may include a plurality of these systems or pieces of equipment, and may have a system or equipment that is not provided in the CEMS 1. The FEMS 11, the BEMS 12, and/or the HEMS 13 may include equipment, such as the generator, and may include electric vehicle supply equipment and the vehicle. Each of these systems or pieces of equipment corresponds to an example of "a plurality of power adjustment resources" according to the present disclosure.

The CEMS server 2 is a computer that manages the power adjustment resources in the CEMS 1. The CEMS server 2 includes a control device 201, a storage device 202, and a communication device 203. The control device 201 includes a processor, and is configured to execute a predetermined arithmetic process. The storage device 202 includes a memory that stores a program executed by the control device 201, and stores various pieces of information (map, relational expression, parameter, and the like) used in the program. In addition, the storage device 202 includes a database, and stores data (power generation history, power consumption history, and the like) related to the power of the system or the equipment provided in the CEMS 1. The communication device 203 includes a communication interface, and is configured to communicate with an outside (another server or the like).

The CEMS server 2 may be an aggregator server. An aggregator is a power company that bundles the plurality of power adjustment resources to provide energy management services. The CEMS server 2 corresponds to an example of a "management server" according to the present disclosure.

The power receiving and transforming equipment 3 is provided at a power reception point (interconnection point) of the microgrid MG, and is configured to switch between parallel (connection)/parallel-off (disconnection) between the microgrid MG and the power system 4. Although not shown, the power receiving and transforming equipment 3 includes a high-voltage side (primary side) switchgear, a transformer, a protection relay, a measurement device, and a control device. In a case where the microgrid MG is interconnected to the power system 4, the power receiving and transforming equipment 3 receives alternating-current power of, for example, a special high voltage (voltage exceeding 7000 V) from the power system 4, steps down the received power, and supplies the stepped down power to the microgrid MG.

The power system 4 is a power network constructed by a power plant and power transmission and distribution equipment. In the present embodiment, a power company serves as both a power generation company and a power transmission and distribution company. The power company corresponds to a general power transmission and distribution company and also corresponds to a manager of the power system 4, and maintains and manages the power system 4.

The power transmission and distribution company server 5 is a computer that belongs to the power company and manages the supply and demand of the power of the power system 4. The power transmission and distribution company server 5 is also configured to execute bidirectional communication with the CEMS server 2.

The market server 10 is a server that manages the power management system 100. The market server 10 decides a price of the power to be bought and sold. In addition, another server (for example, the power transmission and distribution company server 5) may have the function of the market server 10.

In addition, a user 18A owns the electrified vehicle 18. In addition, the user 18A owns a user terminal 30. Here, the user terminal 30 is, for example, a personal computer (PC), a tablet, or a smartphone. It should be noted that the user terminal 30 is preferably a terminal (smartphone or the like) that can be carried by the user 18A.

As described later, the CEMS server 2 can communicate with the electrified vehicle 18 and the user terminal 30. In addition, in the present embodiment, a notification system 300 is configured. The notification system 300 includes the CEMS server 2, one or more electrified vehicles 18, and one or more user terminals 30. The notification system 300 corresponds to an example of a "management system" according to the present disclosure. In addition, the CEMS server 2 in the notification system 300 manages the charge or discharge of each of one or more electrified vehicles 18.

In addition, a contract regarding an amount of the power supplied from the power system 4 to the microgrid MG is concluded between the manager of the CEMS 1 and the power company that maintains and manages the power system 4 for each predetermined period (for example, for each 30 minutes). In accordance with the contract, the CEMS server 2 is requested to adjust an actual amount of the power such that an actual supply amount of the power (actual amount of the power) from the power system 4 to the microgrid MG substantially matches a supply amount of the power planned in advance (planned amount of the power). The control for the adjustment is called "balancing".

In order to achieve the balancing, the CEMS server 2 outputs a demand response (DR) request to various power adjustment resources in the CEMS 1 and executes a feedback control of the power adjustment resources. As a result, various pieces of power (generated power, stored power, consumed power, and the like) in the CEMS 1 can be appropriately reduced, and the contract can be observed. It should be noted that, for the DR request, the CEMS server 2 may determine the presence or absence of output of the DR request. In addition, another server may determine the presence or absence of the output of the DR request and request the CEMS server 2 to make the DR request. In this case, the CEMS server 2 outputs the DR request when the request is received.

Charge or Discharge of Electrified Vehicle

Figure 2:
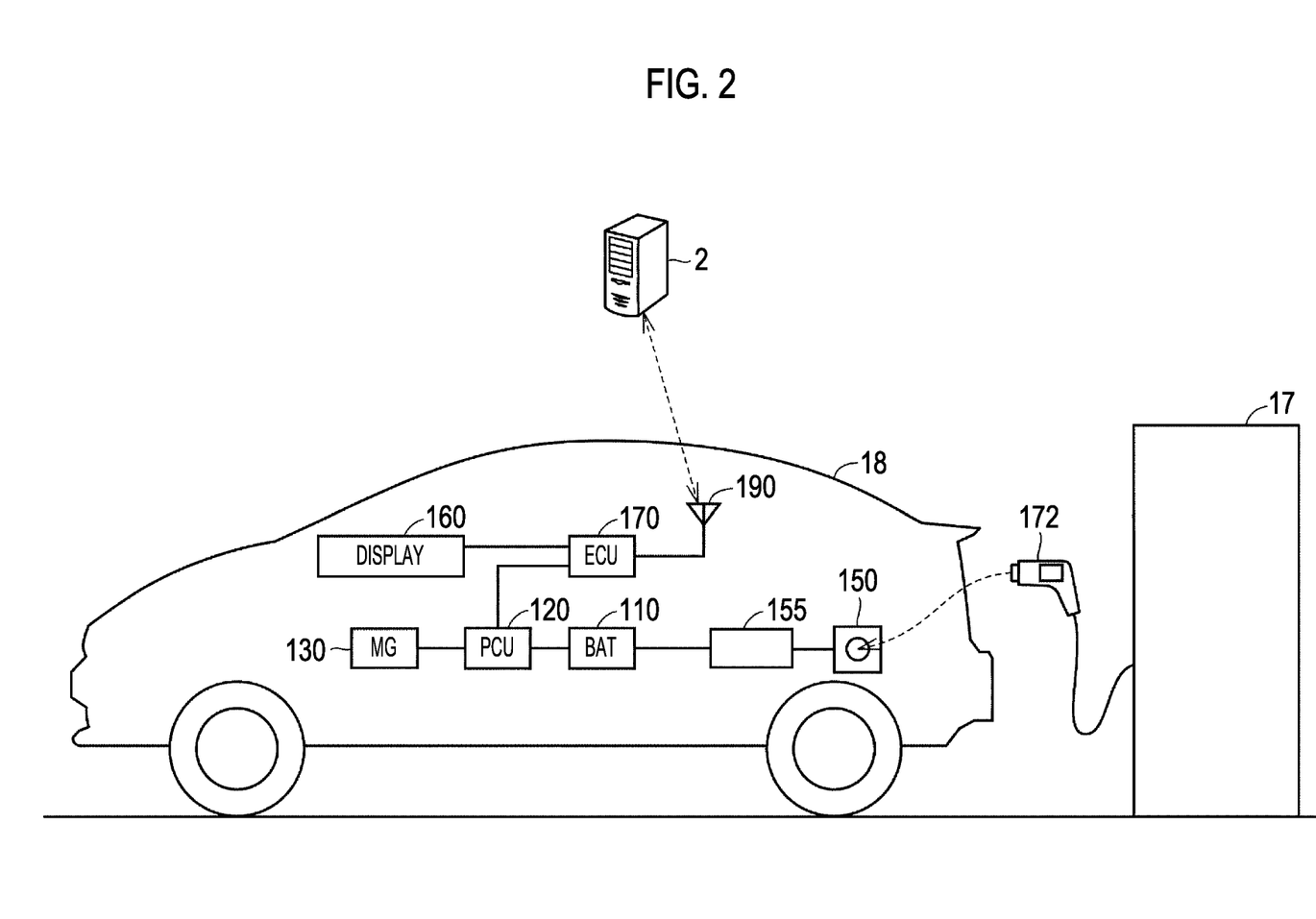
FIG. 2 is a diagram showing a configuration example of an electrified vehicle 18.

Hereinafter, a configuration example of the electrified vehicle 18 will be described. FIG. 2 is a diagram for describing the configuration example of the electrified vehicle 18. In the example of FIG. 2, the electric vehicle supply equipment 17 includes a connector 172. In addition, the electrified vehicle 18 includes an inlet 150, a charger 155, a power storage device 110, a power control unit (PCU) 120, an electronic control unit (ECU) 170, a motor generator 130, a display 160, and a communication module 190.

The connector 172 is inserted into the inlet 150 by the user. The electrified vehicle 18 is configured to receive the power from the microgrid MG via the electric vehicle supply equipment 17 in a state in which the connector 172 inserted into the inlet 150 (in the following, also referred to as "insertion state") (external charge). In addition, the electrified vehicle 18 may be configured to supply the power to the microgrid MG via the electric vehicle supply equipment 17 in the insertion state (external discharge).

The charger 155 converts the power supplied from the inlet 150 into the power that can be charged by the power storage device 110. The power storage device 110 is a power storage element configured to be charged or discharged. The power storage device 110 includes, for example, the secondary battery, such as the lithium ion battery or the nickel hydrogen battery, or the power storage element, such as an electric double layer capacitor. The power storage device 110 stores the power for generating a traveling driving force by the motor generator 130. The power storage device 110 supplies the stored power to the PCU 120. The power storage device 110 transmits detection values of state of charge (SOC), state of health (SOH), and the like of the power storage device 110 detected by a sensor (not shown) to the ECU 170. The ECU 170 transmits the detection values of the SOC and the like to the CEMS server 2 at a predetermined period via the communication module 190. The predetermined period is a short period, for example, 1 second. In addition, the ECU 170 acquires a time zone in which the connector 172 is inserted into the inlet 150. Moreover, the ECU 170 transmits the time zone to the CEMS server 2 via the communication module 190.

It should be noted that, in the present embodiment, the SOH of the power storage device 110 is disclosed as a parameter indicating a deterioration degree of the power storage device 110, but another numerical value may be adopted.

The PCU 120 is a drive device that drives the motor generator 130, and includes a power conversion device, such as a converter and an inverter (neither of which is shown). The PCU 120 is controlled by the ECU 170 and converts direct-current power received from the power storage device 110 into the alternating-current power for driving the motor generator 130.

The PCU 120 rectifies the power generated by the motor generator 130 when the electrified vehicle 18 is braked to a voltage level of the power storage device 110, and outputs the rectified power to the power storage device 110. The power storage device 110 can store the generated power. The generated power is externally discharged to the microgrid MG.

The display 160 displays various pieces of information under the control of the ECU 170. The display 160 displays, for example, a promotion image (see FIG. 7) to be described later. In addition, the electrified vehicle 18 has a navigator function. For example, the user can input a destination to a user interface of the navigator function. A travel route to the input destination is also displayed.

Table Owned by CEMS Server

Figure 3:
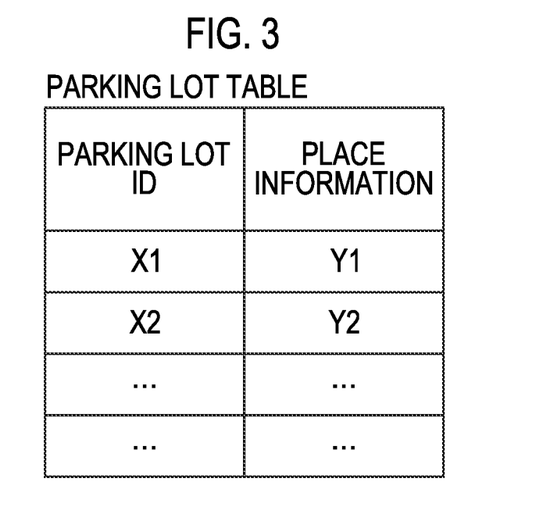
FIG. 3 is a table schematically showing an example of a parking lot table.

Hereinafter, a table owned by the CEMS server 2 will be described. The CEMS server 2 includes a parking lot table and a vehicle table. FIG. 3 is a table schematically showing an example of the parking lot table. In the example of FIG. 3, the parking lot table is composed of a parking lot identification (ID) and place information associated with the parking lot ID. The parking lot ID is information for identifying a parking lot, and the place information is information indicating a place of the parking lot identified by the parking lot ID associated with the place information. The place information is, for example, information specified by longitude and latitude. In addition, the parking lot is a parking lot that can respond to the DR request. Specifically, the parking lot is a parking lot in which the electric vehicle supply equipment 17 that can execute the charge of the electrified vehicle 18 and the discharge of the electrified vehicle 18 is installed.

A manager of the parking lot makes a participation application to the manager of the power management system 100 or the like for participating in the power management system 100. In a case where the manager of the power management system 100 approves the participation application, the parking lot ID of the parking lot is assigned and registered in the parking lot table.

Figure 4:
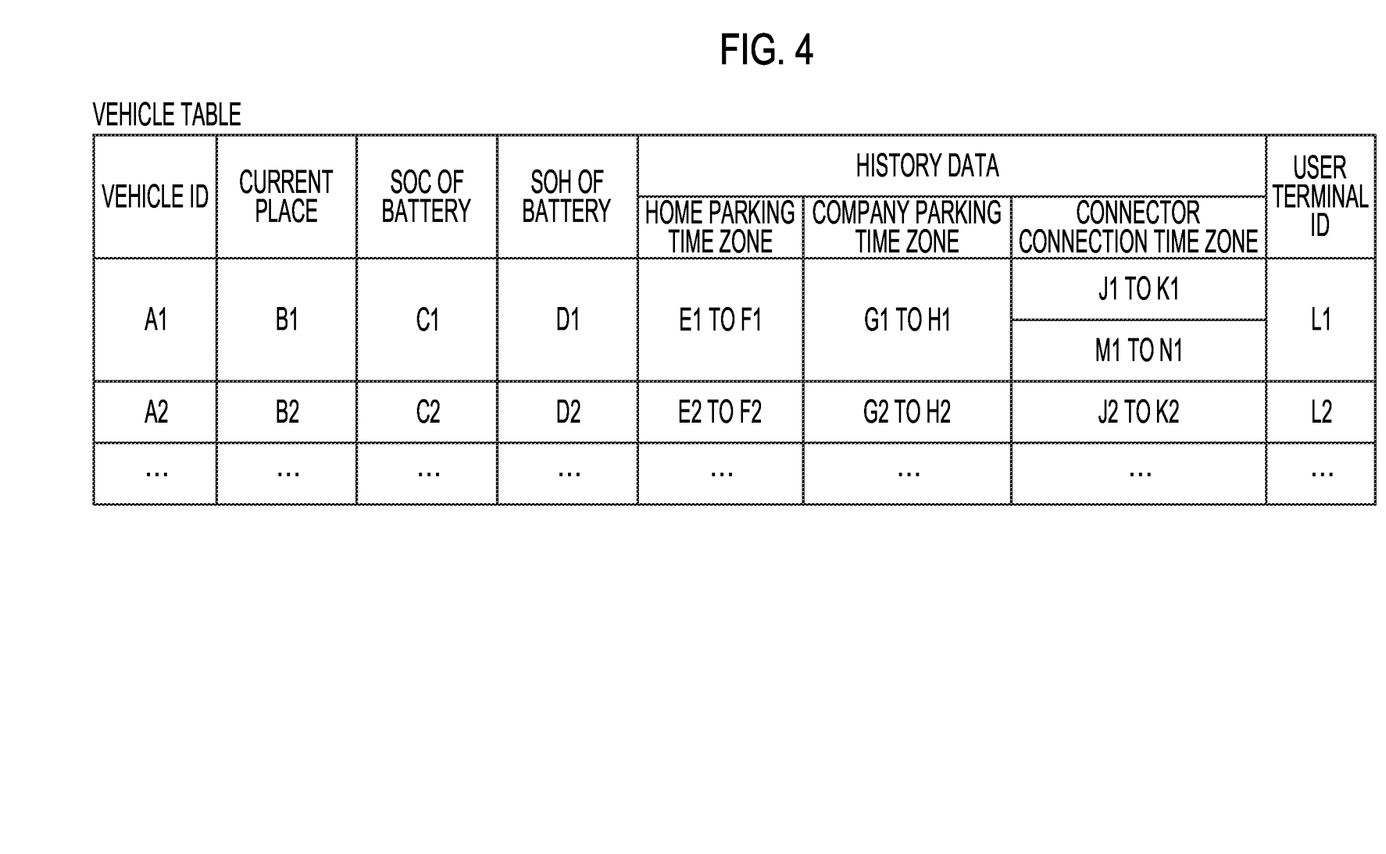
FIG. 4 is a table schematically showing an example of a vehicle table.

FIG. 4 is a table showing an example of the vehicle table. In the example of FIG. 4, a vehicle ID, a current place, the SOC of the battery, the SOH of the battery, history data, and a user terminal ID are defined.

The user of the electrified vehicle 18 makes the participation application to the manager of the power management system 100 or the like for participating in the power management system 100. In a case where the manager of the power management system 100 approves the participation application, the vehicle ID of the electrified vehicle 18 is assigned and registered in the vehicle table. As described above, the vehicle ID is information associated with the electrified vehicle 18, and is information for the CEMS server 2 to recognize the electrified vehicle 18.

The current place is information associated with the vehicle ID. The current place is information indicating the place of the electrified vehicle 18 indicated by the vehicle ID associated with the current place. The CEMS server 2 specifies the current place (latest positional information) of the electrified vehicle 18 based on, for example, global positioning system (GPS) information.

The SOC of the battery is information associated with the vehicle ID. The SOC of the battery is information indicating the SOC of the power storage device 110 of the electrified vehicle 18 indicated by the vehicle ID associated with the SOC of the battery. As described above, the CEMS server 2 acquires the SOC of the battery of the electrified vehicle 18 from the electrified vehicle 18. Moreover, each time the CEMS server 2 acquires the SOC of the battery, the SOC of the battery stored in the vehicle table is updated to the acquired SOC of the battery. Accordingly, the CEMS server 2 can store the latest SOC of the battery in the vehicle table. It should be noted that, in the present embodiment, the ECU 170 of the electrified vehicle 18 calculates the SOC of the battery of the electrified vehicle 18 from a predetermined parameter, and transmits the SOC of the battery to the CEMS server 2 at a predetermined period. It should be noted that, as a modification example, the ECU 170 of the electrified vehicle 18 may transmit the predetermined parameter for calculating the SOC of the battery to the CEMS server 2 at the predetermined period. In this case, the CMES server 2 calculates the SOC of the battery from the predetermined parameter.

The SOH of the battery is information associated with the vehicle ID. The SOH of the battery is information indicating the SOH of the power storage device 110 of the electrified vehicle 18 indicated by the vehicle ID associated with the SOH of the battery. The CEMS server 2 acquires the SOH of the battery of the electrified vehicle 18 from the electrified vehicle 18. Moreover, each time the CEMS server 2 acquires the SOH of the battery, the SOH of the battery stored in the vehicle table is updated to the acquired SOH of the battery. Accordingly, the CEMS server 2 can store the latest SOH of the battery in the vehicle table. It should be noted that, as a modification example, the ECU 170 of the electrified vehicle 18 may transmit the predetermined parameter for calculating the SOH of the battery to the CEMS server 2 at the predetermined period. In this case, the CMES server 2 calculates the SOH of the battery from the predetermined parameter.

The history data is information indicating a history of traveling and stopping of the electrified vehicle 18 indicated by the vehicle ID corresponding to the history data. The history data in the vehicle table of the present embodiment includes a parking time zone at a first place, a parking time zone at a second place, and a connection time zone of the connector 172. In the present embodiment, the first place is the parking lot of home of the user of the electrified vehicle 18 indicated by the vehicle ID corresponding to the first place. The second place is the parking lot of a company of the user of the electrified vehicle 18 indicated by the vehicle ID corresponding to the second place.

A home parking time zone is a time zone in which the electrified vehicle 18 corresponding to the time zone is parked in the parking lot of home. The home parking time zone is, for example, a statistic of the time zones in which the electrified vehicle 18 is parked at home.

A company parking time zone is a time zone in which the electrified vehicle 18 corresponding to the time zone is parked in the parking lot of the company. The company parking time zone is, for example, a statistic of the time zones in which the electrified vehicle 18 is parked in the company.

It should be noted that the CEMS server 2 specifies a position of the parking lot of home and a position of the parking lot of the company by a predetermined method. For example, the user of the electrified vehicle 18 may transmit the positional information of the parking lot of home of the user and the positional information of the parking lot of the company to the CEMS server 2. In addition, the CEMS server 2 may specify the parking time zone of the electrified vehicle 18 based on the information of the current place, and may specify the position of the parking lot of home and the position of the parking lot of the company based on the parking time zone.

In addition, the parking time zone is, for example, a time zone in which the electrified vehicle 18 is present in the parking lot. The parking time zone is, for example, a time zone from a time when the electrified vehicle 18 is stopped to a time when the electrified vehicle 18 starts traveling. In a case where the electrified vehicle 18 is positioned at home, the CEMS server 2 specifies the home parking time zone. Moreover, the CEMS server 2 updates the home parking time zone of the vehicle table based on specified parking time zone and one or more past home parking time zones.

The CEMS server 2 calculates, for example, a statistic of a parking start time of the specified parking time zone and a start time of each of the one or more past home parking time zones, and updates the start time of the home parking time zone of the vehicle table based on the statistic. The statistic may be any amount, any of an average value, a median value, or a mode.

In addition, the CEMS server 2 calculates, for example, a statistic of a parking end time of the specified parking time zone and an end time of each of the one or more past home parking time zones, and updates the end time of the home parking time zone of the vehicle table based on the statistic. The statistic may be any amount, any of an average value, a median value, or a mode.

In addition, the CEMS server 2 updates the company parking time zone by the same method as the home parking time zone.

In addition, the CEMS server 2 leaves the connector connection time zone from a current time to a past predetermined period, and erases the connector connection time zone before the predetermined period. That is, the vehicle table stores one or more connector connection time zones up to the past predetermined period.

The user terminal ID is information for identifying the user terminal 30 of the user of the electrified vehicle 18 corresponding to the user terminal ID. The user terminal ID may be any information. In addition, an address of the user terminal can be specified from the user terminal ID. As described later, the CEMS server 2 transmits promotion information to the address. It should be noted that the parking lot table may be referred to as a parking lot database. In addition, the vehicle table may also be referred to as a vehicle database.

Functional Block Diagram of CEMS Server 2 and Like

Figure 5:
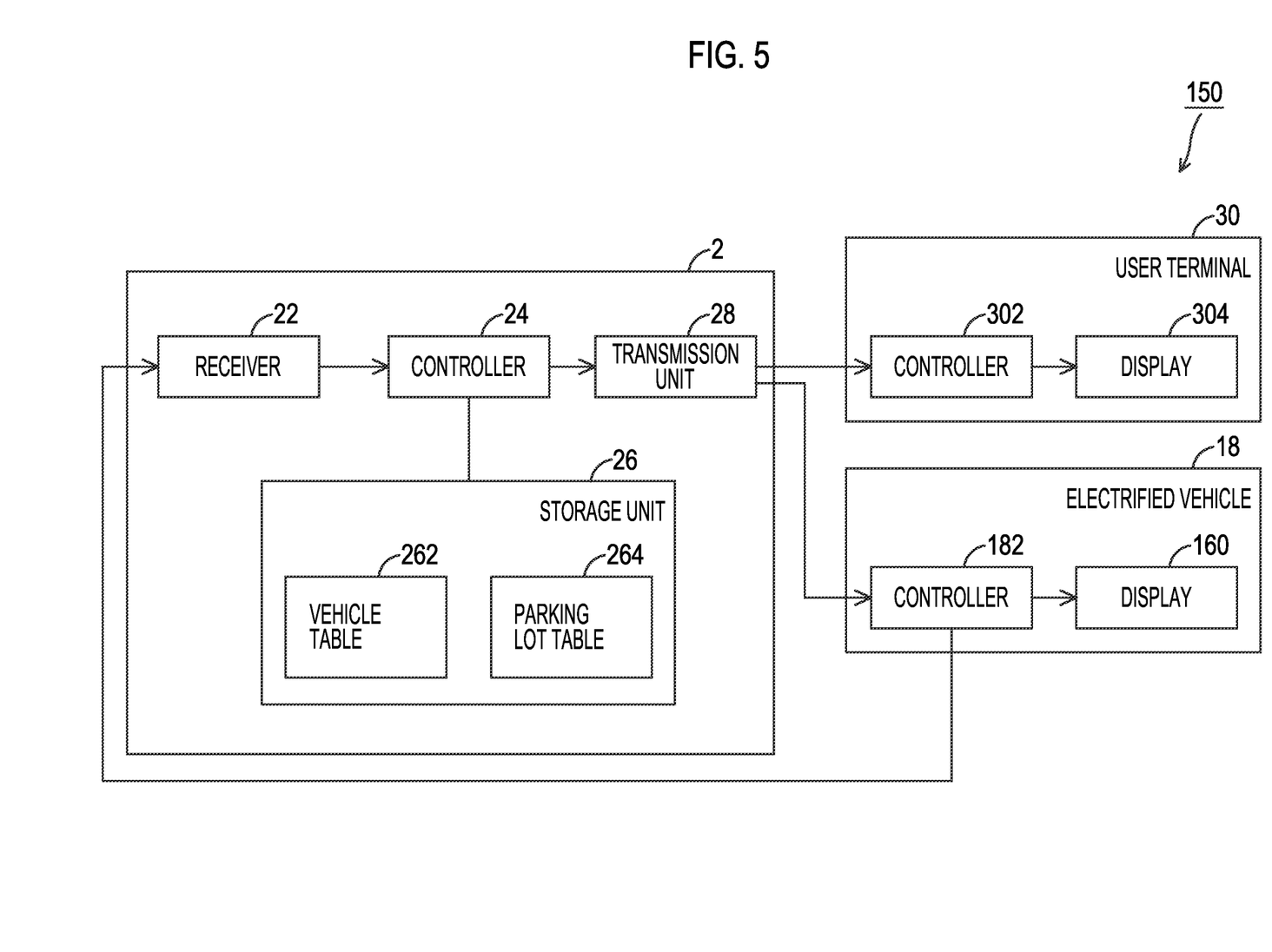

FIG. 5 is a diagram showing a functional block diagram of the CEMS server 2 and the like. In the example of FIG. 5, the CEMS server 2 includes a receiver 22, a controller 24, a storage unit 26, and a transmission unit 28. The receiver 22 and the transmission unit 28 correspond to the communication device 203. The controller 24 corresponds to the control device 201, and the storage unit 26 corresponds to the storage device 202.

The storage unit 26 includes a vehicle table 262 described with reference to FIG. 4 and a parking lot table 264 described with reference to FIG. 3. The user terminal 30 includes a controller 302 and a display 304. In addition, the electrified vehicle 18 includes a controller 182 and the display 160 (see also FIG. 2). The controller 182 corresponds to the ECU 170.

As described above, the controller 182 outputs the SOC of the battery and the SOH of the battery of the electrified vehicle 18 including the controller 182 to the CEMS server 2 at the predetermined period (regularly).

The receiver 22 receives information from an external device. The external device is, for example, the electrified vehicle 18, and acquires the SOC of the battery and the SOH of the battery from the electrified vehicle 18. In addition, the receiver 22 acquires the positional information of the electrified vehicle. The information acquired by the receiver 22 is output to the controller 24.

The controller 24 executes a process in accordance with the information output from the receiver 22. For example, in a case where the receiver 22 receives new parking lot information, the parking lot table is updated based on the parking lot information.

In a case where the receiver 22 receives the information about the application for a new vehicle to the power management system 100, the vehicle ID and the user terminal ID of the vehicle table are added. In a case where the receiver 22 acquires the positional information of the electrified vehicle 18, the controller 24 updates the current place corresponding to the vehicle ID of the electrified vehicle 18. In a case where the receiver 22 acquires the SOC of the battery of the electrified vehicle 18, the controller 24 updates the SOC of the battery corresponding to the vehicle ID of the electrified vehicle 18. In a case where the receiver 22 acquires the SOH of the battery of the electrified vehicle 18, the controller 24 updates the SOH of the battery corresponding to the vehicle ID of the electrified vehicle 18.

In a case where the receiver 22 acquires the home parking time zone of the electrified vehicle 18, the controller 24 updates the home parking time zone corresponding to the vehicle ID of the electrified vehicle 18. In a case where the receiver 22 acquires the company parking time zone of the electrified vehicle 18, the controller 24 updates the company parking time zone corresponding to the vehicle ID of the electrified vehicle 18. In a case where the receiver 22 acquires the connector connection time zone of the electrified vehicle 18, the controller 24 updates the connector connection time zone corresponding to the vehicle ID of the electrified vehicle 18. As described above, the controller 24 updates the vehicle table and the parking lot table at any time.

In addition, the controller 24 determines whether or not a first condition to a fifth condition to be described later are satisfied. In the present embodiment, in a case where the controller 24 determines that all of the first condition to fourth condition among the first condition to fifth condition are satisfied, the controller 24 executes a notification process of giving a notification of the promotion information to be described later. In addition, in a case where the controller 24 determines that any of the first condition to fourth condition is not satisfied, the notification process is not executed.

First, the first condition will be described. The controller 24 estimates the destination of the electrified vehicle 18 when the electrified vehicle 18 starts traveling. The destination is a place at which the electrified vehicle 18 is estimated to reach in the future. Here, an estimation method of the destination may be any method. For example, the controller 24 estimates the destination based on the current place of the vehicle table (GPS information of the electrified vehicle 18) and the history data. It should be noted that the estimation in the present disclosure may be expressed as, for example, "prediction".

For example, in a case where the current place of the electrified vehicle 18 indicates home and an engine of the electrified vehicle 18 is operated at a final time of the home parking time zone or near the final time of the home parking time zone, the controller 24 estimates that the destination is the company. In addition, in a case where the current place of the electrified vehicle 18 indicates the company and the engine of the electrified vehicle 18 is operated at the final time of the home parking time zone or near the final time of the company parking time zone, the controller 24 estimates that the destination is home.

It should be noted that the destination of the electrified vehicle 18 may be estimated by another method. For example, in a case where the user inputs the destination to the navigation system of the electrified vehicle 18, an estimation result of the controller 24 is the input destination.

Further, the controller 24 determines whether or not the estimated destination is a predetermined place at which the charge or discharge of the electrified vehicle 18 is possible. In the following, the predetermined place is also referred to as "charge or discharge place". Here, the charge or discharge place is a place at which the electric vehicle supply equipment 17 described with reference to FIG. 2 is disposed. The controller 24 determines whether or not the estimated destination matches the place indicated by the place information registered in the parking lot table of FIG. 3. In a case where the estimated destination matches the place indicated by the place information registered in the parking lot table, the controller 24 determines that the destination is the charge or discharge place. On the other hand, in a case where the estimated destination does not match the place indicated by the place information registered in the parking lot table, the controller 24 determines that the destination is not the charge or discharge place. In addition, the "first condition" is a condition that the estimated destination is the charge or discharge place.

Hereinafter, the second condition will be described. The controller 24 estimates the parking time zone at the charge or discharge place. The controller 24 estimates the parking time zone based on, for example, the history data. For example, in a case where the controller 24 estimates that the destination is home, the controller 24 extracts the home parking time zone defined by the history data. Moreover, the controller 24 estimates the extracted time zone as the parking time zone.

In addition, the controller 24 determines whether or not a request for the charge or discharge (DR request) is estimated in a period in which the electrified vehicle is present at the charge or discharge place. Further, the controller 24 determines a time of the request. Here, a method of determining the presence or absence of the request and the time of the request will be described. As described above, the market server 10 decides the price of the power to be bought and sold. In addition, the controller 24 acquires the decided price of the power via the receiver 22.

In general, in a case where the amount of the power generated in the power system 4 is large, in order to achieve the balancing, the CEMS server 2 estimates that an increase DR is output to the power adjustment resources in the CEMS 1. In addition, in general, in a case where the amount of the power generated in the power system 4 is large, the price of the power is reduced. The increase DR corresponds to the "request for charge" of the present disclosure.

In addition, in a case where the amount of the power generated in the power system 4 is small, in order to achieve the balancing, the CEMS server 2 estimates that a decrease DR is output to the power adjustment resources in the CEMS 1. In addition, in general, in a case where the amount of the power generated in the power system 4 is small, the price of the power is increased. The decrease DR corresponds to the "request for discharge" of the present disclosure. That is, the DR corresponds to the "request for the charge or discharge" of the present disclosure.

As described above, for example, in a case where the price of the power acquired from the market server 10 or the like deviates from a predetermined range, the CEMS server 2 estimates that the DR (request for the charge or discharge) is output after a predetermined time (for example, two hours). For example, in a case where the price of the power is higher than a third threshold value that is an upper limit value of the predetermined range (that is, in a case where the amount of the generated power is small), the CEMS server 2 estimates that the decrease DR is output after the predetermined time. In addition, in a case where the price of the power is lower than a fourth threshold value that is a lower limit value of the predetermined range (that is, in a case where the amount of the generated power is large), the CEMS server 2 estimates that the increase DR is output after the predetermined time.

It should be noted that the predetermined time may be a time decided in advance by the contract described above or the like. In addition, the CEMS server 2 may execute the estimation by a predetermined method.

In addition, the estimation method is not limited to this method, and another method may be used. For example, the CEMS server 2 may acquire information indicating a possibility that the DR request is made from other devices (for example, the market server 10, the power transmission and distribution company server 5, and a server of retailer (not shown)). The information also includes a time when the DR request is made. In a case where the CEMS server 2 acquires such information, the CEMS server 2 estimates the execution of the DR request and acquires a start time of the DR request.

The "second condition" is a condition that the request for the charge or discharge is estimated in the period in which the electrified vehicle 18 is present at the charge or discharge place. That is, the controller 24 determines that the second condition is satisfied in a case where the specified parking time zone includes the start time of the DR request. On the other hand, in a case where the controller 24 estimates that the DR request is not executed, the controller 24 determines that the second condition is not satisfied. In addition, in a case where the controller 24 estimates that the DR request is executed, but the start time of the DR request is not included in the specified parking time zone, the controller 24 determines that the second condition is not satisfied.

For example, in a case where the destination is the company, the company is the charge or discharge place (place at which the charge or discharge is possible), the parking time of the company is from 9:00 to 18:00, the DR request is estimated, and the start time of the DR request is 15:00, the controller 24 determines that the second condition is satisfied.

Figure 6:
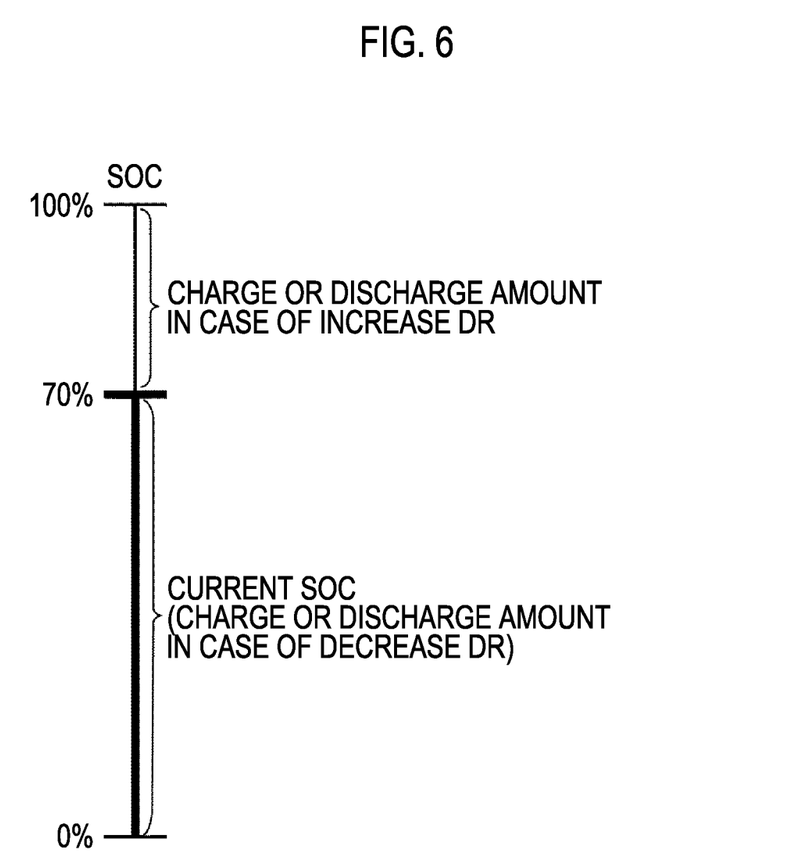
FIG. 6 is a diagram showing an example of a charge or discharge amount of a power storage device.

Hereinafter, the third condition will be described. The controller 24 determines whether or not a charge or discharge amount adjustable by the charge or discharge of the power storage device 110 of the electrified vehicle 18 is equal to or larger than a first threshold value. FIG. 6 is a diagram for describing an example of the charge or discharge amount of the power storage device 110. In the example of FIG. 6, a current SOC is shown. In the example of FIG. 6, the current SOC is 70%.

For example, in a case where the request for increase DR is estimated, it is preferable that the power storage device 110 be charged in response to the request for the increase DR. In this case, the power storage device 110 can be charged with the power corresponding to 30% of the SOC. Accordingly, the adjustable charge or discharge amount in a case where the increase DR is estimated is the power corresponding to 30% of the SOC.

In a case where the request for decrease DR is estimated, it is preferable that the power storage device 110 be discharged in response to the request for the decrease DR. In this case, the power storage device 110 can be discharged with the power corresponding to 70% of the SOC. Accordingly, the adjustable charge or discharge amount in a case where the decrease DR is estimated is the power corresponding to 70% of the SOC.

It should be noted that, in the example of FIG. 6, the charge or discharge amount based on the SOC of the power storage device 110 has been described, but the charge or discharge amount based on another parameter may be adopted. Other parameters are, for example, a voltage value and a current value.

A condition that the charge or discharge amount of the power storage device 110 is equal to or larger than the first threshold value is also referred to as "third condition". That is, the fact that the charge or discharge amount of the power storage device 110 is equal to or larger than the first threshold value (the third condition is satisfied) means that the electrified vehicle 18 including the power storage device 110 can respond to the DR request. On the other hand, the fact that the charge or discharge amount is smaller than the first threshold value (the third condition is not satisfied) means that the power storage device 110 cannot respond to the DR request.

The controller 24 determines whether or not the third condition is satisfied based on the SOC of the vehicle table.

Hereinafter, the fourth condition will be described. In general, the power storage device 110 deteriorates in a case where a charge process or a discharge process is executed. Therefore, it is not preferable to execute the charge or discharge of the power storage device 110 having a high deterioration degree. In addition, the increase DR request or the decrease DR request is not based on the intention of the user, but is a request for achieving the balancing. Therefore, in a case where the deterioration degree of the power storage device 110 is high, when the charge or discharge is executed based on the DR request, there is a possibility that the power storage device 110 fails, and the user feels discomfort in some cases.

Therefore, in the present embodiment, the CEMS server 2 determines whether or not the deterioration degree of the power storage device 110 is smaller than a second threshold value. Here, the deterioration degree is a value determined from the SOH. The deterioration degree is smaller as the SOH is larger, and the deterioration degree is larger as the SOH is smaller. For example, the deterioration degree is the reciprocal of the SOH. In addition, the deterioration degree may be a value determined from another parameter. The deterioration degree may be, for example, a value determined from a full charge capacity of the power storage device 110.

The fourth condition is a condition that the deterioration degree of the power storage device 110 that is a target of the charge or discharge is smaller than the second threshold value.

Hereinafter, the fifth condition will be described. The controller 24 determines whether or not the charge or discharge is executed at the charge or discharge place in which the first condition is determined to be satisfied. More specifically, the controller 24 estimates whether or not the connector 172 is inserted into the inlet 150 at the start time of the estimated DR request at the charge or discharge place in which the first condition is determined to be satisfied. The estimation is executed by using the connector connection time zone in the history data of the controller 24.

For example, in a case where the start time of the estimated DR request is included in the connector connection time zone, the controller 24 estimates that the connector 172 is inserted into the inlet 150. On the other hand, in a case where the start time of the estimated DR request is not included in the connector connection time zone, the controller 24 estimates that the connector 172 is not inserted into the inlet 150.

The fifth condition is a condition that the connector 172 is inserted into the inlet 150 at the start time of the estimated DR request at the charge or discharge place. The controller 24 changes a notification degree of the notification process based on the estimation result regarding the fifth condition.

For example, the fact that the fifth condition is satisfied means that there is a high possibility that the charge or discharge is executed in response to the estimated DR request. In this case, the controller 24 executes the notification process with a weak notification degree.

On the other hand, the fact that the fifth condition is not satisfied means that there is a requirement to execute the charge or discharge without burdening the user in response to the estimated DR request, but there is a high possibility that the user does not execute the charge or discharge. In this case (in a case where the fifth condition is not satisfied), the controller 24 executes the notification process with a strong notification degree.

In the present embodiment, the notification process with the strong notification degree is a process of notifying a first number of notification devices (user terminal) of the promotion information. In addition, the first number is also referred to as P (P is an integer of 1 or more). In addition, the notification process with the weak notification degree is a process of notifying a second number of notification devices of the promotion information. Here, the second number is also referred to as Q (Q is an integer smaller than P and 0 or more).

In the present embodiment, P=2 and Q=1. That is, the notification process with the strong notification degree is a process of notifying two notification devices of the promotion information. In the present embodiment, the two notification devices are the user terminal 30 and the electrified vehicle 18. In addition, the notification process with the weak notification degree is a process of notifying one notification device of the promotion information. In the present embodiment, one notification device is the user terminal 30.

In a case where all of the first condition to the fourth condition are satisfied and the fifth condition is not satisfied, the controller 24 transmits the promotion information to the user terminal 30 and the electrified vehicle 18. In addition, in a case where all of the first condition to the fourth condition are satisfied and the fifth condition is satisfied, the controller 24 transmits the promotion information to the user terminal 30.

In a case where the promotion information is received, the controller 302 of the user terminal 30 displays the promotion image based on the promotion information on the display 304. In addition, in a case where the promotion information is received, the controller 182 of the electrified vehicle 18 displays the promotion image based on the promotion information on the display 160.

Figure 7:
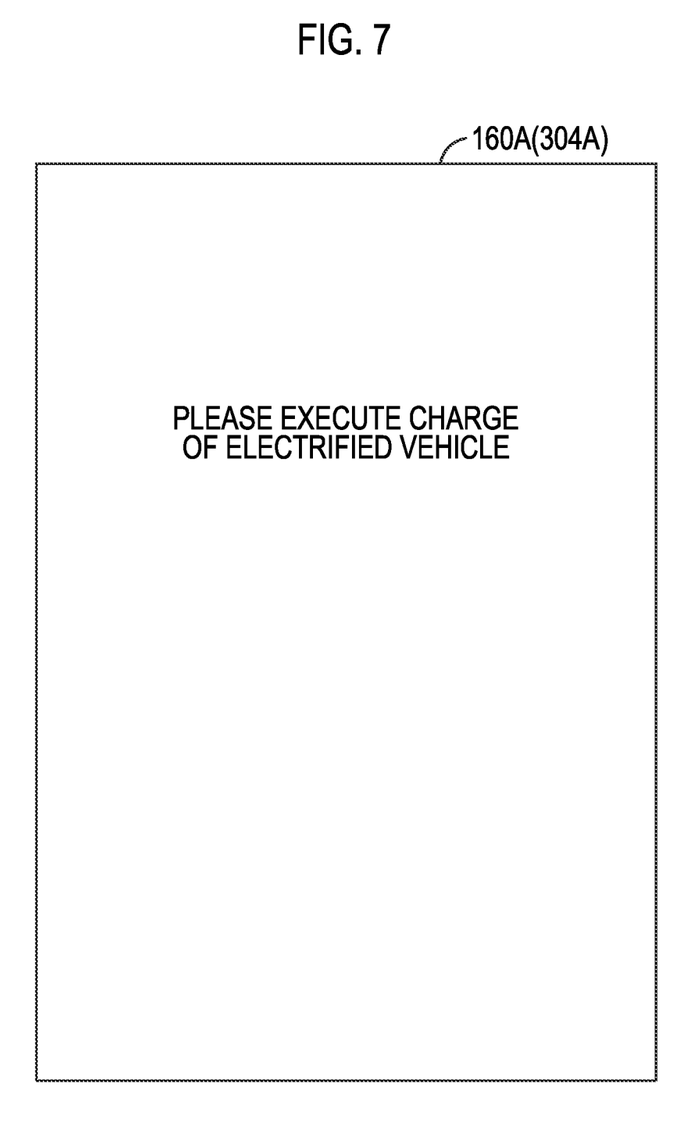
FIG. 7 is a diagram showing an example of a promotion image.

FIG. 7 is a diagram showing an example of the promotion image. The promotion image is displayed in a display region 304A of the display 304 of the user terminal 30 or a display region 160A of the display 160 of the electrified vehicle 18.

The example of FIG. 7 is the promotion image in a case where the request for the increase DR is estimated. In the example of FIG. 7, a text image "please execute the charge of the electrified vehicle" is displayed. In addition, as the promotion image in a case where the request for the decrease DR is estimated, a text image "please execute the discharge of the electrified vehicle" is displayed. In addition, the electrified vehicle 18 may display the promotion image on a meter portion of the display 160.

Flowchart of Process of CEMS Server

Figure 8:
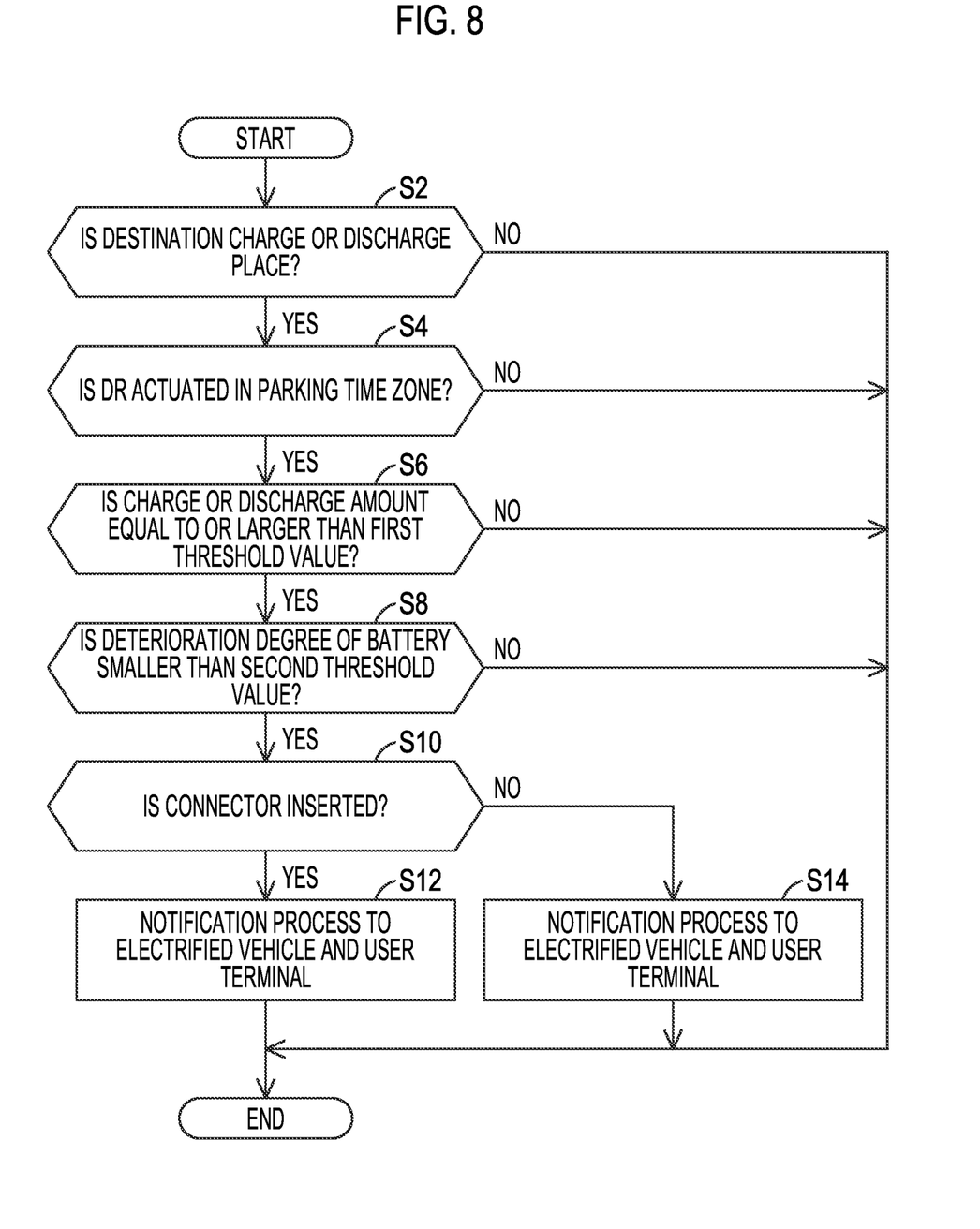
FIG. 8 is a flowchart showing a main process of the CEMS server 2.

FIG. 8 is a flowchart showing a main process of the CEMS server 2. In a case where the engine of the electrified vehicle 18 is operated, the CEMS server 2 executes the process of the flowchart of FIG. 8 for the electrified vehicle 18.

In step S2, the CEMS server 2 determines whether or not the first condition is satisfied. That is, the CEMS server 2 estimates the destination of the electrified vehicle 18 and determines whether or not the destination is the charge or discharge place. In a case where a determination is made as YES in step S2, the process proceeds to step S4.

In step S4, the CEMS server 2 determines whether or not the second condition is satisfied. That is, the CEMS server 2 determines whether or not the output of the DR request is estimated in the period in which the electrified vehicle 18 is parked at the charge or discharge place. In a case where a determination is made as YES in step S4, the process proceeds to step S6.

In step S6, the CEMS server 2 determines whether or not the third condition is satisfied. That is, the CEMS server 2 determines whether or not the charge or discharge amount (see FIG. 6) adjustable by the charge or discharge of the power storage device 110 of the electrified vehicle 18 is equal to or larger than the first threshold value. In a case where a determination is made as YES in step S6, the process proceeds to step S8.

In step S8, the CEMS server 2 determines whether or not the fourth condition is satisfied. That is, the CEMS server 2 determines whether or not the deterioration degree of the power storage device 110 of the electrified vehicle 18 is smaller than the second threshold value. In a case where a determination is made as YES in step S8, the process proceeds to step S10.

In step S10, the CEMS server 2 determines whether or not the fifth condition is satisfied. That is, the CEMS server 2 estimates whether or not the charge or discharge of the electrified vehicle 18 is executed at the charge or discharge place. More specifically, in a case where the start time of the connector connection time zone included in the history data is included in the parking time zone determined as YES in step S4 at the destination (charge or discharge place) determined as YES in step S2, a determination is made as YES in step S10. In addition, in a case where the start time of the connector connection time zone included in the history data is not included in the parking time zone determined as YES in step S4 at the destination (charge or discharge place) determined as YES in step S2, a determination is made as NO in step S10.

In a case where a determination is made as NO in step S10, the CEMS server 2 causes the electrified vehicle 18 and the user terminal 30 to execute the notification process in step S12. In a case where a determination is made as YES in step S10, the CEMS server 2 causes the user terminal 30 to execute the notification process in step S14. In a case where the process of step S12 or step S14 ends, the process of FIG. 8 ends.

In addition, in the example of FIG. 8, in a case of NO in any of steps S2 to S8, the process of FIG. 8 ends without executing the notification process.

In an in-vehicle device disclosed in the related art, in some cases, a user notification is executed even in a case where the electrified vehicle does not need to be charged. Therefore, a problem that the user is caused to feel annoyed about the charge or discharge of the electrified vehicle can occur.

Therefore, the CEMS server 2 of the present embodiment can execute the notification process in a case where the first condition and the second condition are satisfied. Stated another way, the condition that the CEMS server 2 executes the notification process include the first condition and the second condition. The first condition is a condition that the destination of the electrified vehicle 18 is the charge or discharge place. In addition, the second condition is the condition that the request (DR) for the charge or discharge is estimated in the period in which the electrified vehicle 18 is present at the charge or discharge place. The fact that the first condition and the second condition are satisfied means that the user can smoothly participate in the DR request without changing a travel schedule (destination or the like) of the user. Therefore, in a case where the first condition and the second condition are satisfied, the notification process can be executed. Accordingly, it is possible to promote the response to the DR request without changing travel behavior of the user (travel schedule of the user).

On the other hand, the fact that the first condition or the second condition is not satisfied means that it is difficult to participate in the DR request without changing the travel schedule of the user. For example, in order for the CEMS server 2 to participate in the DR request without satisfying the first condition, the user needs to change the destination to the charge or discharge place. In addition, in order for the CEMS server 2 to participate in the DR request without satisfying the second condition, the user needs to change the parking time zone to be included in the start time of the DR request. Accordingly, the CEMS server 2 does not execute the notification process in a case where the first condition or the second condition is not satisfied (NO in step S2 or NO in step S4 of FIG. 8). Accordingly, the CEMS server 2 can reduce the annoyance of the user. In addition, for example, in the user who does not have the electric vehicle supply equipment 17 in the parking lot of home and has the electric vehicle supply equipment 17 in the parking lot of the company, in a case where the destination of the user is the parking lot of home, the CEMS server 2 can prevent the notification process from being executed.

In addition, the CEMS server 2 can execute the notification process in a case where the first condition and the second condition are satisfied and the third condition is satisfied. Stated another way, the condition that the CEMS server 2 executes the notification process includes the third condition. The third condition is a condition that the charge or discharge amount adjustable by the charge or discharge of the power storage device 110 is equal to or larger than the first threshold value. The fact that the third condition is satisfied means that the user can smoothly participate in the DR request without separately executing the charge or discharge of the power storage device 110. Therefore, in a case where the first condition to the third condition are satisfied, the notification process can be executed. Accordingly, it is possible to promote the response to the DR request without changing travel behavior of the user (travel schedule of the user).

On the other hand, the fact that the third condition is not satisfied means that it is difficult to participate in the DR request without separately executing the charge or discharge of the power storage device 110. For example, in order to participate in the DR request without satisfying the third condition, the user needs to execute the charge or discharge of the power storage device 110 of which the charge or discharge amount is smaller than the first threshold value. Accordingly, the CEMS server 2 does not execute the notification process in a case where the third condition is not satisfied (NO in step S6 of FIG. 8). Accordingly, the CEMS server 2 can reduce the annoyance of the user.

In addition, the CEMS server 2 can execute the notification process in a case where the first condition to the fourth condition are satisfied. Stated another way, the condition for the CEMS server 2 to execute the notification process includes the fourth condition. The fourth condition is a condition that the deterioration degree of the power storage device 110 that is a target of the charge or discharge is equal to or smaller than the second threshold value. The fact that the fourth condition is satisfied means that the user can smoothly participate in the DR request without replacing the power storage device 110. Therefore, in a case where the first condition to the fourth condition are satisfied, the notification process can be executed. Accordingly, it is possible to promote the response to the DR request without changing travel behavior of the user (travel schedule of the user).

On the other hand, the fact that the fourth condition is not satisfied means that it is difficult to participate in the DR request without replacing the power storage device 110. For example, in order to participate in the DR request without satisfying the fourth condition, replacing the power storage device 110 having a high deterioration degree with another power storage device 110 is needed. Accordingly, the CEMS server 2 does not execute the notification process in a case where the fourth condition is not satisfied (NO in step S8 of FIG. 8). Accordingly, the CEMS server 2 can reduce the annoyance of the user.

In addition, the fact that the fifth condition is satisfied means that there is a high possibility that the charge or discharge is executed in response to the estimated DR request. In this case, the CEMS server 2 executes the notification process with the weak notification degree. Therefore, it is possible to make the user who has a high possibility of executing the charge or discharge recognize the charge or discharge without causing the user to feel annoyed (step S14).

In addition, the fact that the fifth condition is not satisfied means that there is the requirement to execute the charge or discharge without burdening the user in response to the estimated DR request, but there is a high possibility that the user does not execute the charge or discharge. In this case, the CEMS server 2 executes the notification process with the strong notification degree. Therefore, it is possible to strongly promote the charge or discharge to the user who has a high possibility of not executing the charge or discharge without causing the user to feel annoyed (step S12).

In addition, in the present embodiment, the notification process with the weak notification degree is the process of displaying the promotion image on one user terminal, and the notification process with the strong notification degree is the process of displaying the promotion image on the two user terminals. Therefore, in the notification process with the weak notification degree, it is possible to make the user recognize the promotion image without causing the user to feel annoyed. In addition, in the notification process with the strong notification degree, it is possible to make the user easily recognize the promotion image.

In addition, in the present embodiment, the electrified vehicle 18 executes the charge or discharge in response to the DR request, and the DR request is the increase DR or the decrease DR. Therefore, the CEMS server 2 can execute the notification process in response to the DR request.

In addition, the notification process of the present embodiment promotes the insertion of the connector 172 for executing the charge or discharge into the electrified vehicle 18. Therefore, it is possible to promote the user to execute the charge or discharge by the connector 172.

Modification Example (1) In the embodiment described above, the configuration has been described in which the condition that the notification process is executed is the condition that a determination is made as YES in all of the first condition to the fourth condition. However, the condition that the notification process is executed may be, for example, the first condition and the second condition, and may not include the third condition and the fourth condition.

In addition, a configuration may be adopted in which the condition that the notification process is executed is a condition that a determination is made as YES in all of the first condition to the third condition. In addition, a configuration may be adopted in which the condition that the notification process is executed is a condition that a determination is made as YES in all of the first condition, the second condition, and the fourth condition.

In addition, in the embodiment described above, the configuration has been described in which P=2 and Q=1. However, Q=0 may be adopted. That is, in a case where a determination is made that the fifth condition is not satisfied, the CEMS server 2 may not execute the notification process. In addition, the CEMS server 2 may not determine whether or not the fifth condition is satisfied.

(2) In the embodiment described above, the configuration has been described in which the charge and discharge are contact charge and contact discharge (that is, the charge and discharge via the connector 172). However, the charge and discharge may be non-contact charge and non-contact discharge. For example, regarding the non-contact charge, in a case where the electrified vehicle 18 is present at a place at which the non-contact charge can be executed, the non-contact charge is automatically executed. The place at which the non-contact charge can be executed (in the following, also referred to as "non-contact charge place") is, for example, a place at which a facility (for example, an electric coil) capable of the non-contact charge is present.

In a case where such a configuration is adopted, when the electrified vehicle 18 is present at the non-contact charge place, the user can execute switching to any of a first mode in which the non-contact charge is executed and a second mode in which the non-contact charge is not executed. In addition, in step S10, the CEMS server 2 determines whether the mode is the first mode or the second mode. In a case where a determination is made that the mode is the first mode, the process proceeds to step S14. In addition, in a case where a determination is made that the mode is the second mode, the process proceeds to step S12. With such a configuration, the CEMS server 2 can respond to the DR request by the non-contact charge.

(3) In the embodiment described above, the configuration has been described in which the notification degree of the notification process is the number of notification devices on which the promotion image is displayed (see steps S10 to S14 in FIG. 8). However, the notification degree of the notification process may be another element. For example, to make the notification degree stronger may be to increase the display region of the promotion image (see FIG. 7), and to make the notification degree weaker may be to reduce the display region of the promotion image.

In addition, the notification process may adopt a configuration in which a promotion sound is output. The promotion sound is, for example, a sound "please execute the charge of the electrified vehicle". In addition, in a case where such a configuration is adopted, the volume of the promotion sound may be increased to make the notification degree stronger, and the volume of the promotion sound may be reduced to make the notification degree weaker.

(4) In the embodiment described above, the configuration has been described in which the first place is home of the user and the second place is the company of the user. However, the first place and the second place may be another place. In addition, a target place is not limited to two places (first place and second place), and may be three or more places.

(5) The manager of the CEMS server 2 may be able to change the first threshold value. For example, the power system 4 generates an excessively large amount of the power. In this case, the increase DR is requested. In addition, since an excessively large amount of the power is generated, it is preferable to increase the demand for the power as much as possible. Accordingly, in this case, the manager of the CEMS server 2 reduces the first threshold value. As a result, the CEMS server 2 can execute the notification process (notification process of promoting the charge) even for the user of the electrified vehicle 18 having a small charge or discharge amount. Accordingly, since the CEMS server 2 can promote the execution of the charge or discharge even for the user of the electrified vehicle 18 having a small charge or discharge amount, a larger amount of the power can be adjusted.

(6) Regarding the determination process and the estimation process described with reference to FIG. 8 and the like, the configuration has been described in which the CEMS server 2 executes the determination process and the estimation process by using the parking lot table and the vehicle table. However, at least a part of the determination process and the estimation process described with reference to FIG. 8 and the like may be executed by another method (for example, another algorithm). For example, the CEMS server 2 may estimate the destination by using artificial intelligence (AI). The CEMS server 2 may execute at least a part of the determination process and the estimation process described with reference to FIG. 8 and the like, for example, by inputting a predetermined parameter to a neural network.

(7) In the embodiment described above, the configuration has been described in which the charge or discharge request is the DR request. However, the request for the charge or discharge may be another request.

The embodiment disclosed this time should be considered to be exemplary examples and not to be restrictive in all respects. The scope of the present disclosure is shown by the scope of claims rather than the description of the embodiment described above, and is intended to include all changes within the meaning and scope equivalent to the scope of claims.

What is claimed is:

1. A management server that manages an electrified vehicle configured to execute charge or discharge that is charge from an outside of the electrified vehicle or discharge from the outside of the electrified vehicle, the management server comprising:
a processor configured to execute a notification process of notifying a user of the electrified vehicle of promotion information for promoting the charge or discharge; and
a memory configured to store a program executable by the processor, wherein:
the processor is configured to execute the notification process in a case where a first condition and a second condition are satisfied, and not to execute the notification process in a case where the first condition or the second condition is not satisfied;
the first condition is a condition that a destination of the electrified vehicle is a predetermined place at which the charge or discharge of the electrified vehicle is possible; and
the second condition is a condition that a request for the charge or discharge is predicted in a period in which the electrified vehicle is present at the predetermined place.

2. The management server according to claim 1, wherein the processor is configured to execute the notification process in a case where a third condition that a charge or discharge amount adjustable by the charge or discharge is equal to or larger than a first threshold value, the first condition, and the second condition are satisfied, and not to execute the notification process in a case where the third condition is not satisfied.

3. The management server according to claim 1, wherein the processor is configured to execute the notification process in a case where a fourth condition that a deterioration degree of a battery that is a target of the charge or discharge is equal to or smaller than a second threshold value, the first condition, and the second condition are satisfied, and not to execute the notification process in a case where the fourth condition is not satisfied.

4. The management server according to claim 1, wherein the processor is configured to change a notification degree of the notification process based on an estimation result of whether or not the charge or discharge of the electrified vehicle is executed at the predetermined place.

5. The management server according to claim 4, wherein the processor is configured to execute the notification process of notifying a first number of notification devices of the promotion information in a case where the estimation result is a result that the charge or discharge of the electrified vehicle is not executed at the predetermined place, and to execute the notification process of notifying a second number of notification devices smaller than the first number of the promotion information in a case where the estimation result is a result that the charge or discharge of the electrified vehicle is executed at the predetermined place.

6. The management server according to claim 1, wherein:
the electrified vehicle is configured to execute the charge or discharge in accordance with a demand response; and
the request is an increase demand response or a decrease demand response.

7. The management server according to claim 1, wherein:
the electrified vehicle is configured to execute the charge or discharge by insertion of a charge or discharge connector; and
the notification process is a process of promoting insertion of the charge or discharge connector into the electrified vehicle.

8. A management system comprising:
an electrified vehicle; and
a management server configured to manage the electrified vehicle, wherein:
the electrified vehicle is configured to execute charge or discharge that is charge from an outside of the electrified vehicle or discharge from the outside of the electrified vehicle;
the management server is configured to execute a notification process of notifying a user of the electrified vehicle to promote the charge or discharge in a case where a first condition and a second condition are satisfied, and not to execute the notification process in a case where the first condition or the second condition is not satisfied;
the first condition is a condition that a destination of the electrified vehicle is a predetermined place at which the charge or discharge of the electrified vehicle is possible; and
the second condition is a condition that a request for the charge or discharge is predicted in a period in which the electrified vehicle is present at the predetermined place.

* * * * *